United States Patent [19]
Rennick et al.

[11] 3,777,559
[45] Dec. 11, 1973

[54] SYSTEM FOR ANALYZING ENGINE PERFORMANCE

[75] Inventors: Lyle V. Rennick, Mission Viejo, Calif.; John D. Shore, Oconto, Wis.; William L. Mitchael, Fullerton, Calif.; Ronald B. Weiss; Clarence L. Almich, both of Anaheim, Calif.

[73] Assignee: Northrop Corporation, Los Angeles, Calif.

[22] Filed: Apr. 21, 1972

[21] Appl. No.: 246,142

[52] U.S. Cl. .............................................. 73/117.3
[51] Int. Cl. ......................................... G01m 15/00
[58] Field of Search ............................ 73/116, 117.3

[56] References Cited
UNITED STATES PATENTS
3,005,948  10/1961  Broder et al. ................... 73/116 UX
3,630,076  12/1971  Staudt............................... 73/117.3

Primary Examiner—Jerry W. Myracle
Attorney—Edward A. Sokolski et al.

[57] ABSTRACT

A first counter is driven by pulses from a signal generator. A second counter is driven by the output of the signal generator divider by a factor in accordance with the number of cylinders in the engine under test. The output of the second counter is shifted to a register in response to a pulse which is phase synchronized with a predetermined point in the rotation cycle of the engine. The output of the register and the output of the first counter are compared for coincidence, a coincidence signal being generated which corresponds to a predetermined point in the cycle of each of the engine cylinders. These coincidence signals are used to generate window signals which provide gating signals to sensor circuits. The sensor circuits receive the outputs of sensors which provide electrical signals in accordance with various engine parameters. The outputs of the sensor circuits are gated to an indicator by the window signals so that the sensed parameters can be observed at predetermined identifiable portions of each engine rotation cycle.

10 Claims, 4 Drawing Figures

SYSTEM FOR ANALYZING ENGINE PERFORMANCE

This invention relates to the analysis of engine operation, and more particularly to a digital system capable of indicating various engine operating parameters during precise portions of the engine operating cycle.

In the analysis of the operation of an engine, it is helpful to view and compare various engine operating parameters during preselected portions of the operating cycle. Thus, for example, a malfunction can be pinpointed to a particular cylinder, bearing, etc. Most engine analyzers of the prior art use a cathode ray tube display which is synchronized with the firing of the engine cylinders. In view of the fact that the cylinder firing is generally not reliably and fixedly related to the cam shaft and actual cylinder position due to the fact that firing can occur early or late, this type of prior art device does not provide an accurate indication of the position of the engine parts when the observation is made. This type of analysis thus has its limitations where precisely accurate measurements need to be made. Further, the scope readout of the prior art requires individual judgment in its evaluation.

The system of this invention overcomes the shortcomings of the aforementioned prior art technique in providing accurate gating windows for the various signals representing engine parameters to be evaluated, these window signals being precisely synchronized with pre-selected portions of the engine cycle. Further, in the system of this invention, the signals can be automatically evaluated against predetermined reference voltages so that their departure from acceptable range can be automatically indicated without any evaluation being necessary on the part of an operator. Also, means are provided in the system of the invention to adjust both the width and position of the window within a predetermined range, thus enabling the analysis of a variety of selected portions of the engine cycle.

It is therefore an object of this invention to provide an improved engine analyzer in which engine parameters can be monitored at various precise selected portions of the operating cycle.

It is another object of this invention to enable the more accurate determination of the portion of an engine operating cycle in which a malfunction occurs.

It is still a further object of this invention to provide a system in which automatic indications of out of tolerance operation of an engine are provided.

Other objects of this invention will become apparent as the description proceeds in conjunction with the accompanying drawings, of which:

Briefly described, the system of the invention includes a detector for generating a pulse output signal corresponding to a predetermined point in the engine rotation cycle, such as the top dead center position of the No. 1 cylinder. A signal generator is used to generate clock pulses at a frequency substantially higher than that of the pulse output of the detector. The output of the signal generator is divided by a factor in accordance with the number of cylinders in the engine. The divider output is fed to a counter, the output of this counter being stored in a register. The output of the signal generator is fed to a second counter, the outputs of the counter and the register being compared for coincidence in a comparator. The divider is reset by the pulse output of the detector. This reset signal also operates to shift the count of the first counter into the register. The output of the comparator is a pulse signal corresponding to predetermined fractional portions of the engine cycle which in the case where the detector output corresponds to the top dead center position of the first cylinder will correspond to the top dead center position of each of the other cylinders. The comparator output signals are fed to window generators where window signals for gating various sensed output signals to an indicator are generated. The window generators may include means for adjusting the position and width of each of the windows. The outputs of the window generators are fed to a window selector which feeds various selected windows to sensor circuits for use in gating the outputs of these circuits to the indicator. The sensor circuits may be operated to compare sensor outputs representing various engine parameters with predetermined reference voltages representing tolerance limits of these parameters, an output being provided by a sensor circuit to the indicator whenever the sensed parameters are not within the predetermined tolerances.

Figure 1:
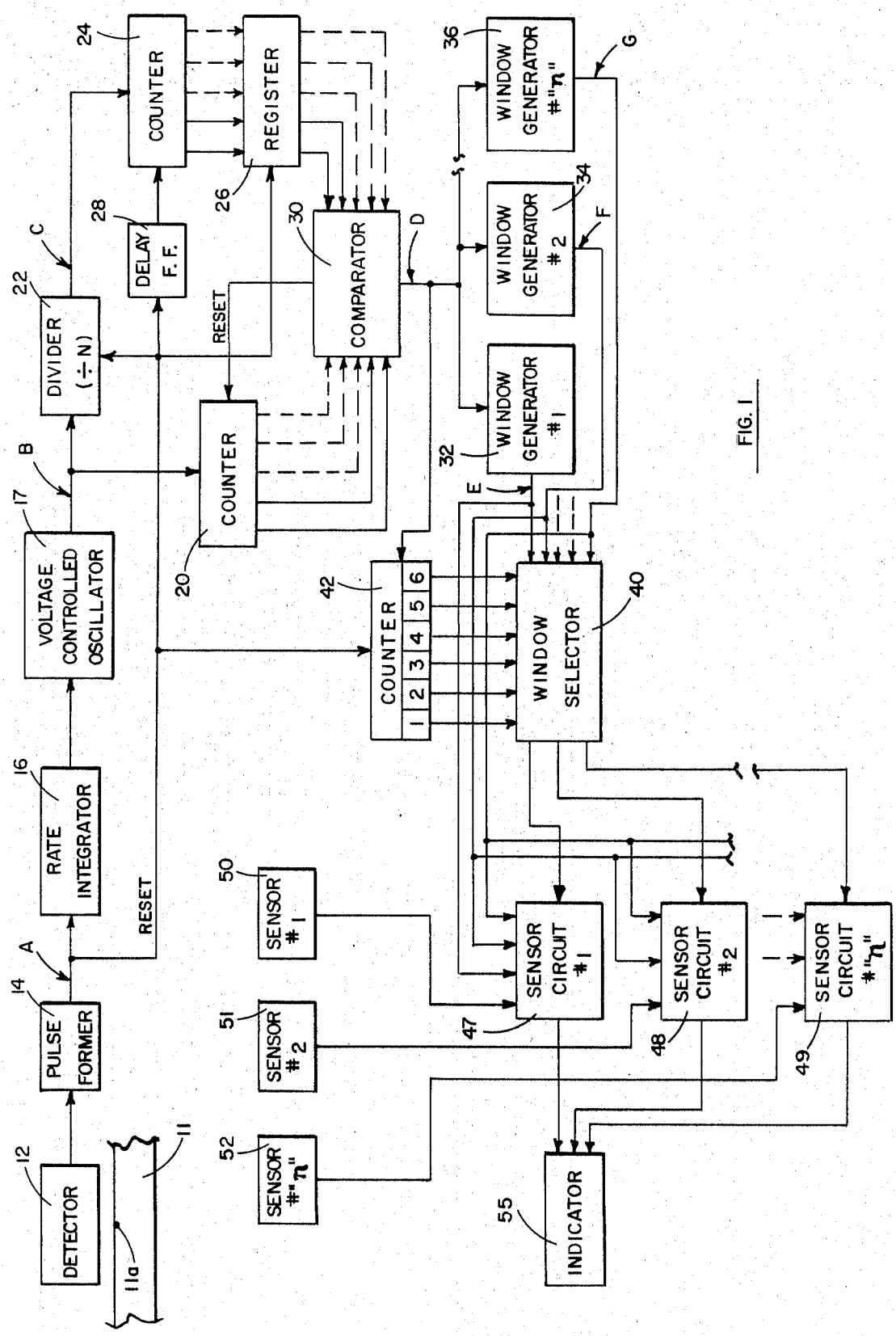
FIG. 1 is a functional schematic drawing of one embodiment of the system of the invention.

Referring now to FIG. 1, one embodiment of the invention is schematically illustrated. A rotating shaft 11 of the engine, which may be the cam shaft, water pump drive shaft, etc., which is precisely synchronized with the rotation of the engine, has a marker 11a thereon which precisely indicates a predetermined portion of the engine cycle, such as the top dead center position of the number 1 cylinder. Marker 11a may comprise a white spot which reflects light into a photoelectric sensor 12 each time it is directly opposite the sensor. Alternatively, marker 11a may comprise a notch in the shaft with sensor 12 being a magnetic sensor which thus senses a change in magnetic field each time the notched portion passes.

Figure 2:
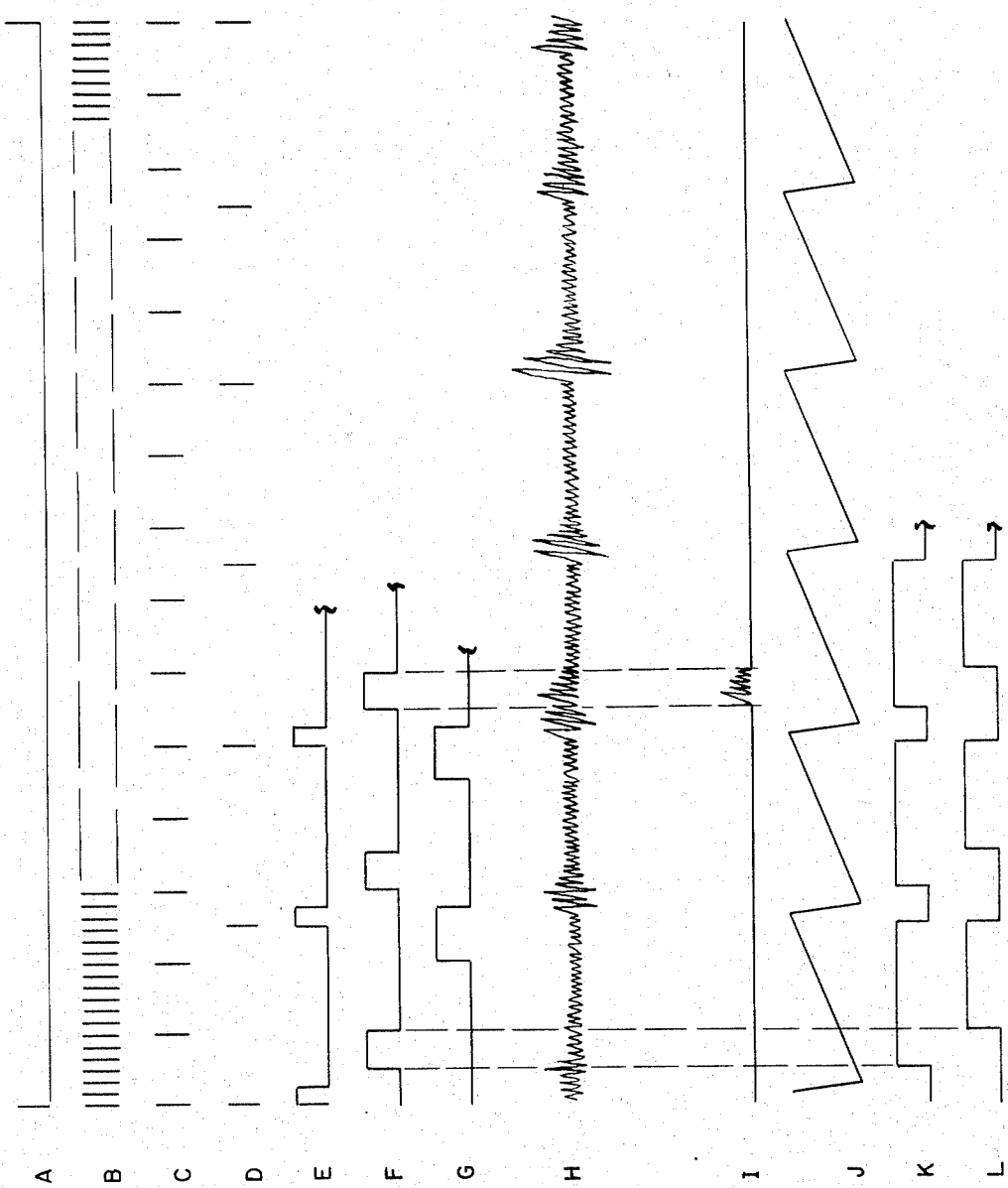
FIG. 2 is a series of wave forms illustrating the operation of the embodiment of FIG. 1.

The output of sensor 12 is fed to pulse former 14, which provides a sharp pulse corresponding to the leading edge of the sensed signal, as indicated in Line A of FIG. 2. Thus, a sharp pulse is developed for each rotation of shaft 11. Pulse former 14 may comprise a differentiating circuit, the output of which drives a flipflop. The output of pulse former 14 is fed to rate integrator 16, which generates a DC voltage directly proportional to the output frequency of the pulse former. The output of rate integrator 16 is fed to voltage controlled oscillator 17 and controls the frequency of the output thereof which is shown on Line B of FIG. 2. Thus, the frequency of the output of voltage controlled oscillator 17 is automatically adapted in accordance with the frequency of rotation of shaft 11.

It is to be noted that the frequency of the output of voltage controlled oscillator 17 is not critical and this signal could be generated by a wholly independent clock pulse generator. However, the self-adaptation of the frequency of this signal in accordance with the speed of rotation of the engine has the advantage automatically providing the lowest pulse frequency needed. Thus, for example, when the speed of rotation of the engine is low, the pulse frequency can be correspondingly low for a given measurement resolution, while as the engine rotation increases, the pulse frequency is increased correspondingly to maintain the same resolution.

The output of voltage controlled oscillator 17 shown on line B of FIG. 2 is fed to counter 20, which may comprise a conventional digital counter. The output of voltage controlled oscillator 17 is also fed to divider 22 which divides this frequency by a factor "N," corresponding to the number of cylinders in the engine. The output of divider 22, which is shown on Line C of FIG. 2, is thus for the illustrative example 1/6 of that of the output of voltage controlled oscillator 17 (shown on Line B), the engine in this instance being a six-cylinder engine. For an eight-cylinder engine, this factor would be 8, etc.

The output of divider 22 is fed to counter 24. The output of pulse former 14, which appears once for each rotation of shaft 11, is used as a re-set signal for divider 22, resetting this divider, which may comprise a binary counter, to zero. This pulse also operates to shift the output of counter 24 into register 26. The re-set pulse is also fed to delay flipflop 28 which immediately after the output of counter 24 has been shifted into register 26, resets counter 24 to zero. The output of register 26 is fed to comparator 30, as is the output of counter 20. When the output of counter 20 corresponds to that of register 26, the comparator generates a pulse output as indicated on Line D of FIG. 2. If the output of pulse former 14 occurs at the top dead center of cylinder 1, it should be apparent that the output of comparator 30, as shown on Line D of FIG. 2, will occur precisely at the top dead center position of each of the cylinders in turn. With coincidence between the pulse counts fed to comparator 30, a reset signal is fed from the comparator to counter 20, to reset this counter for a new count.

The output of comparator 30 is fed to each of window generators 32, 34 and 36. The number of window generators utilized will depend on the particular application requirements. Each window generator, as to be described more fully in connection with FIG. 3, generates a window signal, the position of which and width of which may be adjusted. For example, an output could be produced for window generator 32 as shown on Line E of FIG. 2, an output for window generator 34 as shown on Line F, and an output for window generator 36 as shown on Line G. It is to be appreciated, however, that a great variety of pulse widths and positions could be utilized for each of these window generators, as to be explained further on in the specification in connection with FIG. 3.

The output of each window generator is fed to window selector 40, which also receives the output of six-count counter 42. Counter 42, which preferably provides a visual indication of its count receives the output of comparator 30 and is reset by the output of pulse former 14. Thus, counter 42, for the illustrative six-cylinder engine example, provides outputs corresponding to the top dead center position of each of the six cylinders. The outputs of counter 42 are fed to window selector 40. Window selector 40 may comprise appropriate switching circuits capable of providing various combinations of window generator outputs synchronized with outputs of counter 42. The outputs of each of the window generators may be provided for any combination or all of the cylinders.

Figure 4:
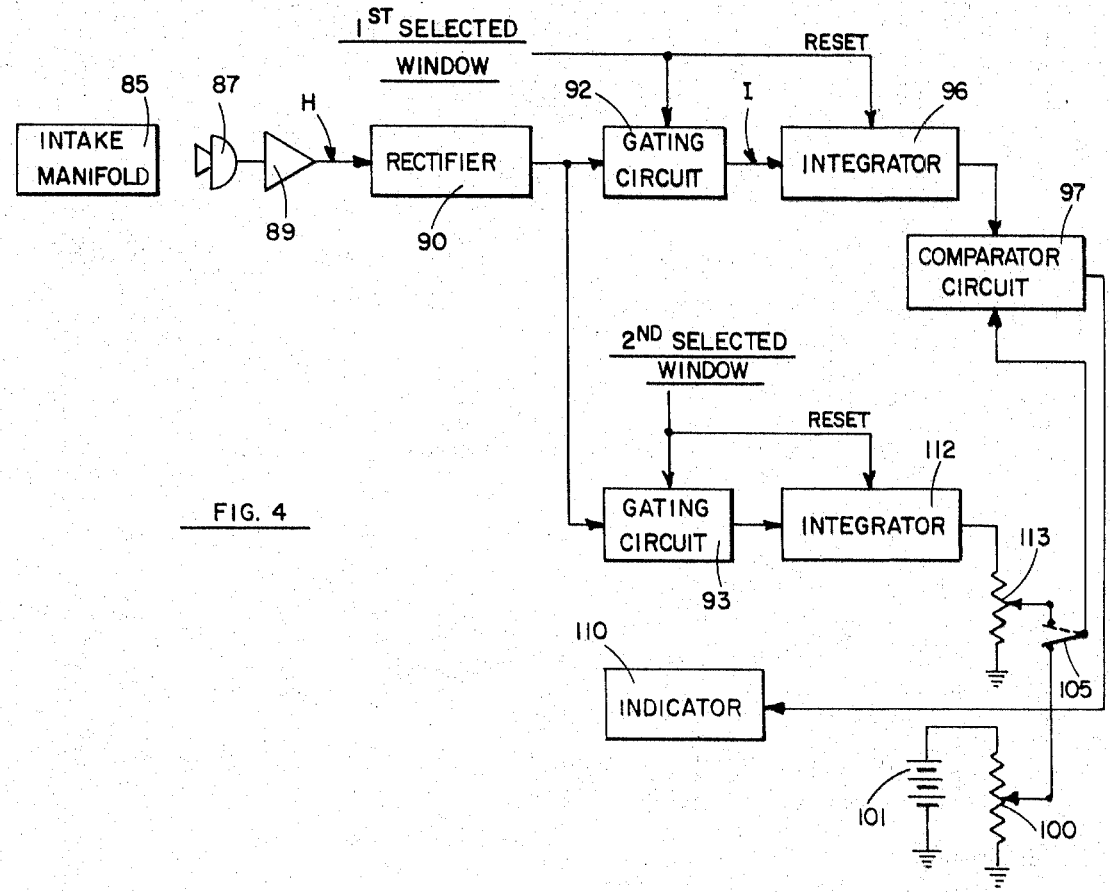
FIG. 4 is a functional schematic drawing illustrating a typical sensor circuit of the embodiment of FIG. 1.

The outputs of window selector 40 are fed to sensor circuits 47–49. Each sensor circuit receives an output from a corresponding one of sensors 50–52. The number of sensors and sensor circuits utilized will of course correspond to the number of parameters to be measured. The outputs of sensors 47–49 are fed to indicator 55, which indicates when the output of any sensor exceeds predetermined tolerance limits. A typical sensor circuit is illustrated in FIG. 4 and will be described further on in the specification in connection therewith.

Figure 3:
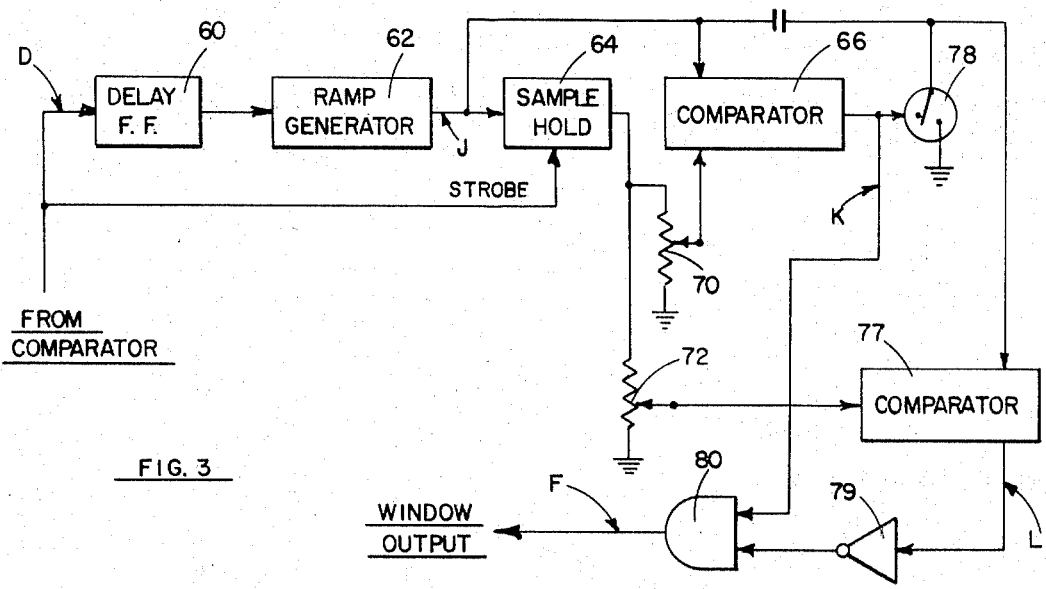
FIG. 3 is a functional schematic drawing illustrating a typical window generator of the embodiment of FIG. 1.

Referring now to FIG. 3, a typical window generator which may be utilized in the system of the invention is schematically illustrated. The output of comparator 30 (FIG. 1), which is shown on Line D of FIG. 2, is fed through delay flipflop 60 to ramp generator 62. Ramp generator 62, which may comprise an R-C charging circuit, is discharged to zero in response to the output of delay flipflop 60, and thus immediately thereafter commences its charge cycle to generate a ramp signal as indicated in Line J of FIG. 2. The output of ramp generator 62 is fed both to sample-hold circuit 64 and comparator 66. The output of the comparator (Line D of FIG. 2) provides a strobe signal for sample-hold circuit 64. Sample-hold circuit operates to detect the peak of the ramp, this peak ramp signal being placed across potentiometers 70 and 72. The arm of potentiometer 70 is connected to comparator 66, while the arm of potentiometer 72 is connected to comparator 77. Potentiometer 70 is used to set the position of the window, while potentiometer 72 is used to set the width of this window, as now to be explained.

The output of ramp generator 62 is fed to comparator 66 for comparison with the voltage at the arm of potentiometer 70. When coincidence is reached between the voltage at the arm of potentiometer 70 and the output of ramp generator 62, comparator 66 actuates switch 78 which may comprise a transistor switching circuit, to the "open" position (indicated in FIG. 3), a positive voltage being generated at the output of the comparator, as indicated in Line K of FIG. 2. In this manner, the start of the window and thus its position is determined by the setting of potentiometer 70. It should be immediately apparent that the potentiometer can be set to cause the window signal shown in Line K of FIG. 2 to commence anywhere along the ramp (shown in Line J). When the ramp cycle is completed, switch 78 returns to the "ground" position.

The ramp voltage at switch 78, which starts from zero with actuation of the switch (in view of the fact that prior to this time the switch is in the ground position) is fed to comparator 77 for comparison with the voltage at the arm of potentiometer 72. When this ramp voltage reaches the voltage set on potentiometer 72, comparator 77 generates a positive output voltage as indicated on Line L in FIG. 2. The output of comparator 66 is fed to AND gate 80. The output of comparator 70 is inverted in inverter amplifier 79 and fed to AND gate 80. Thus, when comparator 66 has a positive output representing a TRUE state, and the output of comparator 77 has a zero output which as inverted by means of amplifier 79, provides a TRUE input to gate 80, the gate will provide a TRUE output as indicated on Line F of FIG. 2. Thus, the width and position of the window signal, which for the illustrative example is shown on Line F of FIG. 2, is determined by the settings of the potentiometers 72 and 70 respectively. It thus should be apparent that the width and position of the window can be adjusted as desired to meet various application requirements.

Referring now to FIG. 4, a typical sensor circuit which may be utilized in the system of the invention is schematically illustrated. This particular sensor circuit utilizes a microphone which is acoustically coupled to the intake manifold, exhaust manifold or crankcase to measure the noise generated thereby which provides an indication of engine performance. Other types of sensors, such as dynamic pressure transducers attached to the fuel lines, etc., can be utilized to measure various other engine parameters.

The sound present at intake manifold 85 is sensed by microphone 87, the output of the microphone being amplified by means of amplifier 89. A typical output signal which might appear at the output of amplifier 89 is shown in Line H of FIG. 2. The output of amplifier 89 is rectified by means of rectifier 90, the output of the rectifier being fed to gating circuits 92 and 93. Gating circuit 92 is gated by means of the selected window output of window selector 40 (See FIG. 1). The window selector may provide a window for any one, any combination, or all of the cylinders. A typical output signal for gating circuit 92 is illustrated in Line I of FIG. 2, this signal being for the window signal shown on Line F with the No. 3 counter output selected by window selector 40 (FIG. 1). The output of the gating circuit is integrated by means of integrator 96, the output of this integrator being fed to comparator circuit 97. Integrator 96 is reset to zero by the trailing edge of the window signal. A DC reference voltage is provided at the arm of potentiometer 100, this potentiometer having a DC power source 101 connected thereacross. With selector switch 105 in the position shown in FIG. 4, the voltage at the arm of potentiometer 100 is fed to comparator circuit 97 for comparison with the output of integrator 96. Potentiometer 100 is set to provide a voltage at the upper tolerance limits for the noise signal at the intake manifold, such that when this tolerance limit is reached, a signal indicating such will be provided to indicator 110 which may comprise a signal lamp. It should be immediately apparent that potentiometer 100 can be calibrated to provide any desired tolerance limit.

Gating circuit 93 receives as its gate a second selected window. The output of gating circuit 93 is integrated by means of integrator 112, the output of the integrator being fed to potentiometer 113. With switch 105 thrown to the position indicated by the dotted line, comparator circuit 97 receives the voltage at the arm of potentiometer 113. Thus, the output of integrator 96 is compared with a preselected percentage of the output of integrator 112. In this manner, a comparison can be made between the noise developed with the firing of various cylinders with indicator 110 indicating when the ratio between these two signals exceeds a predetermined value. As for integrator 96, integrator 112 is also reset by the trailing edge of the window.

The system of this invention thus provides means for indicating the performance of an engine at precisely defined portions of its operating cycle.

While this invention has been described and illustrated in detail, it is to be clearly understood that this is intended by way of illustration and example only, and is not to be taken by way of limitation, the spirit and scope of this invention being limited only by the terms of the following claims.

We claim:

1. In a system for determining the performance of an internal combustion engine having a plurality of cylinders, said system including means for sensing various engine operating parameters, the improvement comprising means for indicating the values of said parameters during a precisely defined portion of the engine operating cycle, comprising:
    means for generating a reference pulse signal indicative of a predetermined point in each operating cycle of the engine,
    means for generating a train of pulses,
    a first counter means for counting the output of said pulse train generating means,
    divider means for dividing the output of said pulse train generating means by a factor corresponding to the number of cylinders in said engine,
    second counter means for counting the output of said divider means,
    register means for receiving the output count of said second counter means,
    the output of said reference signal generating means being fed to said second counter means and said register means to provide a reset signal therefor,
    comparator means receiving the outputs of said first counter means and said register means for generating an output signal when the output of said register means corresponds to the output of said first counter means, the output of said comparator means corresponding to the operating cycle of each of the engine cylinders,
    window generator means for generating window signals in response to the output of said comparator means,
    sensor circuit means for receiving the outputs of said sensing means and generating a signal in accordance therewith, said sensor circuit means including a gating circuit, and
    indicator means for receiving the outputs of said sensor circuit means and providing an indication thereof,
    the window signals being fed to the gating circuit of said sensor circuit means to gate the outputs thereof to said indicator means at preselected portions of the rotation cycle of said engine.

2. The system of claim 1 wherein said window generator means includes means for adjusting the width and position of the window.

3. The system of claim 1 wherein said sensor circuit means comprises means for providing a reference voltage and means for comparing the sensing means output with said reference voltage, said voltage being indicative of the tolerance limits of the engine parameter being measured, a signal being provided from said sensor circuit means to said indicator means whenever the sensing means outputs are not within said tolerance limits.

4. The system of claim 1 wherein said window generator means includes a plurality of window generators each for generating a window signal at one of said preselected portions of the rotation cycle of the engine, and further including window selector means for selecting various window outputs of said window generators for use in gating the sensor circuit means.

5. The system of claim 4 and further including a counter responsive to the output of said comparator means for providing a count corresponding to a predetermined point in the operating cycle of each of the cylinders of the engine, the output of said counter being fed to said window selector means for use in gating the window signals to said sensor cirucit means.

6. The system of claim 1 wherein said means for generating a train of pulses comprises a voltage controlled oscillator and a rate integrator for generating a voltage for controlling said voltage controlled oscillator, said rate integrator operating in response to said reference pulse signal, whereby the frequency of the output of said voltage controlled oscillator is in accordance with the rotation speed of the engine.

7. A system for providing signals indicative of the operating condition of an internal combustion engine having a plurality of cylinders during preselected portions of the operating cycle of said engine comprising:
   means for generating a reference pulse signal synchronized with a predetermined point of said cycle,
   means for generating a train of clock pulses,
   divider means for dividing said train of pulses by a factor corresponding to the number of cylinders in said engine,
   first counter means for counting the output of said divider means,
   a register for registering the count in said first counter in response to the output of said reference pulse signal generating means,
   second counter means for counting the pulses in said clock pulse train,
   means for delaying said reference pulse, the output of said delaying means being fed to said first counter means to reset said first counter means,
   comparator means for comparing the output of said second counter with the output of said register and for generating a pulse output when these outputs correspond,
   window generator means responsive to the pulse output of said comparator means for generating a window signal in a predetermined phase relationship with said last mentioned pulse output,
   sensor means for sensing an operating parameter of the engine,
   sensor circuit means for generating an output signal in accordance with the sensor means output, said sensor circuit means including a gating circuit, said window signal being fed to the gating circuit of said sensor circuit means to gate said output signal, and
   indicator means for indicating said output signal.

8. The system of claim 7 wherein said window generator means includes means for adjusting the position and width of the window.

9. The system of claim 7 wherein said means for generating a train of clock pulses comprises a voltage controlled oscillator and a rate integrator connected to said oscillator for generating a voltage for controlling said oscillator, said rate integrator operating in response to said reference pulse signal.

10. The system of claim 7 wherein said sensor circuit means comprises means for providing a reference voltage indicative of the tolerance limits of the parameter sensed by said sensor means and means for comparing the sensor means output with said reference voltage, a signal being provided to said indicator means whenever the sensor means outputs are not within said tolerance limits.

* * * * *